United States Patent [19]

Sakai

[11] Patent Number: 4,763,196

[45] Date of Patent: Aug. 9, 1988

[54] IMAGE SENSING DEVICE

[75] Inventor: Shinji Sakai, Kanagawa, Japan

[73] Assignee: Canon Kabushiki Kaisha, Tokyo, Japan

[21] Appl. No.: 68,736

[22] Filed: Jun. 29, 1987

Related U.S. Application Data

[63] Continuation of Ser. No. 621,503, Jun. 18, 1984.

[30] Foreign Application Priority Data

Jun. 20, 1983 [JP] Japan ................... 58-111721

[51] Int. Cl.⁴ .............................. H04N 3/14
[52] U.S. Cl. .................. 358/213.13; 358/213.19; 354/474
[58] Field of Search ......... 358/213.13, 213.19, 358/909, 209; 354/472, 474, 475

[56] References Cited

U.S. PATENT DOCUMENTS

| | | | |
|---|---|---|---|
| 4,139,289 | 2/1979 | Yamada et al. | 354/474 |
| 4,161,000 | 7/1979 | Cleveland | 358/225 |
| 4,172,645 | 10/1979 | Tokutomi | 354/474 |
| 4,243,308 | 1/1981 | Yamada et al. | 354/474 |
| 4,324,462 | 4/1982 | Tano et al. | 354/474 |
| 4,366,501 | 12/1982 | Tsunekawa et al. | 358/310 |
| 4,420,773 | 12/1983 | Toyoda et al. | 358/335 |
| 4,456,931 | 6/1984 | Toyoda et al. | 358/335 |
| 4,489,350 | 12/1984 | Kimura | 358/213 |
| 4,504,866 | 3/1985 | Saito . | |

FOREIGN PATENT DOCUMENTS

58-63277  4/1983  Japan ................... 358/213

Primary Examiner—Robert Lev
Attorney, Agent, or Firm—Toren, McGeady & Associates

[57] ABSTRACT

An image sensing device includes image sensing apparatus for converting an optical image into electrical information and stores the information. Time control apparatus selects the incident time or the storing time of the optical image at the image sensing apparatus from a plurality of time values determined by multiplying the vertical period of a standard television period by $2^{n/m}$ (wherein n represents an integer and m an integer other than 0). Display apparatus displays the time value. The display apparatus has a plurality of display values which can be approximately expressed as $2^{q/p}$ (wherein p represents an integer and q an integer other than 0) and correspond to the plurality of time values.

40 Claims, 5 Drawing Sheets

| Td | | Te (DISPLAY, SETTING) | Te' |
|---|---|---|---|
| NTSC | PAL SECAM | | |
| 256/60 | 256/50 | 4 | 4" |
| 128/60 | 128/50 | 2 | 2" |
| 64/60 | 64/50 | 1 | 1" |
| 32/60 | 32/50 | 1/2 | 2 |
| 16/60 | 16/50 | 1/4 | 4 |
| 8/60 | 8/50 | 1/8 | 8 |
| 4/60 | 4/50 | 1/16 (1/15) | 15 |
| 2/60 | 2/50 | 1/32 (1/30) | 30 |
| 1/60 | 1/50 | 1/64 (1/60) | 60 |
| 1/120 | 1/100 | 1/128 (1/125) | 125 |
| 1/240 | 1/200 | 1/256 (1/250) | 250 |
| 1/480 | 1/400 | 1/512 (1/500) | 500 |
| 1/960 | 1/800 | 1/1024 (1/1000) | 1000 |
| 1/1920 | 1/1600 | 1/2048 (1/2000) | 2000 |
| 1/3840 | 1/3200 | 1/4096 (1/4000) | 4000 |

| Td | | Te |
|---|---|---|
| (NTSC) | PAL SECAM | (DISPLAY, SETTING) |
| $1/60 \times 2^{7}$ | $1/50 \times 2^{7}$ | $2^{1} = 2$ |
| $1/60 \times 2^{\frac{13}{2}}$ | $1/50 \times 2^{\frac{13}{2}}$ | $2^{\frac{1}{2}} = 1.4$ (1.5) |
| $1/60 \times 2^{6}$ | $1/50 \times 2^{6}$ | $2^{0} = 1$ |
| $1/60 \times 2^{\frac{11}{2}}$ | $1/50 \times 2^{\frac{11}{2}}$ | $2^{-\frac{1}{2}} = 1/1.4$ (1/1.5) |
| $1/60 \times 2^{5}$ | $1/50 \times 2^{5}$ | $2^{-1} = 1/2$ |
| $1/60 \times 2^{\frac{9}{2}}$ | $1/50 \times 2^{\frac{9}{2}}$ | $2^{-\frac{3}{2}} = 1/2.8$ (1/3) |
| $1/60 \times 2^{4}$ | $1/50 \times 2^{4}$ | $2^{-2} = 1/4$ |
| $1/60 \times 2^{\frac{7}{2}}$ | $1/50 \times 2^{\frac{7}{2}}$ | $2^{-\frac{5}{2}} = 1/5.7$ (1/6) |
| $1/60 \times 2^{3}$ | $1/50 \times 2^{3}$ | $2^{-3} = 1/8$ |
| $1/60 \times 2^{\frac{5}{2}}$ | $1/50 \times 2^{\frac{5}{2}}$ | $2^{-\frac{7}{2}} = 1/11.3$ (1/12) |
| $1/60 \times 2^{2}$ | $1/50 \times 2^{2}$ | $2^{-4} = 1/16$ (1/15) |
| $1/60 \times 2^{\frac{3}{2}}$ | $1/50 \times 2^{\frac{3}{2}}$ | $2^{-\frac{9}{2}} = 1/22.6$ (1/20) |
| $1/60 \times 2^{1}$ | $1/50 \times 2^{1}$ | $2^{-5} = 1/32$ (1/30) |
| $1/60 \times 2^{\frac{1}{2}}$ | $1/50 \times 2^{\frac{1}{2}}$ | $2^{-\frac{11}{2}} = 1/45.3$ (1/45) |
| $1/60 \times 2^{0}$ | $1/50 \times 2^{0}$ | $2^{-6} = 1/64$ (1/60) |
| $1/60 \times 2^{-\frac{1}{2}}$ | $1/50 \times 2^{-\frac{1}{2}}$ | $2^{-\frac{13}{2}} = 1/90.5$ (1/90) |
| $1/60 \times 2^{-1}$ | $1/50 \times 2^{-1}$ | $2^{-7} = 1/128$ (1/125) |
| $1/60 \times 2^{-\frac{3}{2}}$ | $1/50 \times 2^{-\frac{3}{2}}$ | $2^{-\frac{15}{2}} = 1/181.0$ (1/180) |
| $1/60 \times 2^{-2}$ | $1/50 \times 2^{-2}$ | $2^{-8} = 1/256$ (1/250) |
| $1/60 \times 2^{-\frac{5}{2}}$ | $1/50 \times 2^{-\frac{5}{2}}$ | $2^{-\frac{17}{2}} = 1/362.0$ (1/350) |
| $1/60 \times 2^{-3}$ | $1/50 \times 2^{-3}$ | $2^{-9} = 1/512$ (1/500) |
| $1/60 \times 2^{-\frac{7}{2}}$ | $1/50 \times 2^{-\frac{7}{2}}$ | $2^{-\frac{19}{2}} = 1/724$ (1/750) |
| $1/60 \times 2^{-4}$ | $1/50 \times 2^{-4}$ | $2^{-10} = 1/1024$ (1/1000) |

IMAGE SENSING DEVICE

This is a continuation of application Ser. No. 621,503, filed June 18, 1984.

BACKGROUND OF THE INVENTION

1. Field of the Invention

This invention relates to an image sensing device which is provided with an improved display system.

2. Description of the Prior Art

For the image sensing device of a video camera or the like, various methods have been contrived to continuously change the exposure time effected by a shutter or to continuously control the image sensing storing time such as in a camera tube. In carrying out image sensing, a device of this type permits fine control over the stored electric charge because the exposure time or storage time is continuously variable. However, in situations where such a photography parameter relative to image forming time is used in combination with other parameters, such as an aperture value, and the sensitivity of the image sensing device for better photography, the conventional image sensing device of this type has extremely poor operability. Furthermore, in order to continuously vary the image forming time, a complex control circuit is necessary. Furthermore, the read-out output from an image sensing device cannot be reproduced by an ordinary TV receiver unless a read-out driving operation is carried out in synchronization with a standard television period. Therefore, the continuous control over the exposure time or storing time (hereinafter the two will comprehensively be called the image forming time) necessitates a timing arrangement synchronized with the standard television period. However, it has been extremely difficult to synchronize image sensing device driving timing while continuously changing the image forming time.

Furthermore, in cases where various photography effects are to be obtained from a combination of different photography parameters such as an aperture value, exposure time, etc. as mentioned above, these photography parameters must necessarily be perceptible. However, it has hardly been possible to display the image sensing time, etc. without recourse to an extremely complex display arrangement. For example, when using the NTSC system camera, it is difficult to promptly determine an aperture value for apposite photography with an effected, display for example, "0.25 sec".

It is a general object of the present invention to provide an image sensing device which is capable of eliminating the above shortcomings of the prior art.

It is a more specific object of the invention to provide an image sensing device in which a display is readily observable and parameters such as image sensing time, etc. can be set and controlled without difficulty.

It is another object of the invention to provide an image sensing device and a method suited for obtaining an optimum photography effect using combinations of various parameters.

These and further objects and features of the invention will become apparent from the following detailed description of the preferred embodiments thereof taken in conjunction with the accompanying drawings.

SUMMARY OF THE INVENTION

An image sensing device comprising image sensing means for converting an optical image into an electrical signal and reading means for reading out the electrical signal of the image sensing means at a standard television period. The apparatus also includes time control means for discretely controlling image signal forming time at the image sensing means. The time control means is capable of selecting for the control a plurality of time values Td satisfying the following condition in cases where the value Td is smaller than Ts:

$Td = Ts \times 2^{-n/m}$, wherein Ts represents the standard televison period, m and n represent natural numbers.

DETAILED DESCRIPTION OF THE PREFERRED EMBODIMENTS

Figure 1:
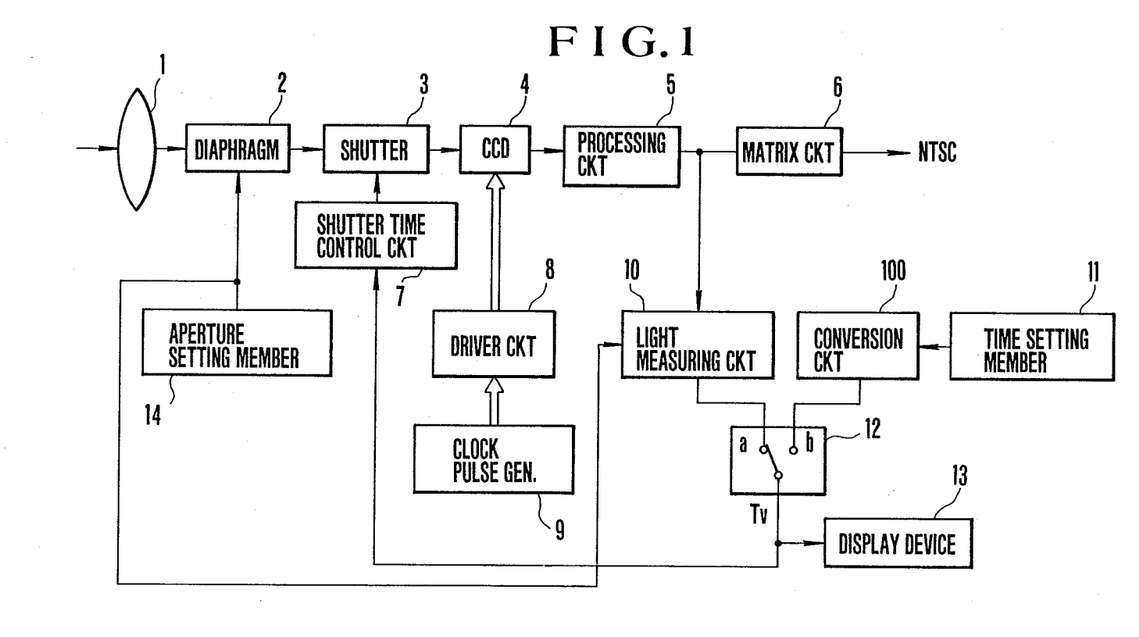
FIG. 1 is a block diagram showing an image sensing device in a first embodiment of the invention.
Figure 4A:
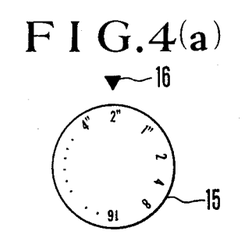
FIG. 4(a) shows, by way of example, a setting (or indication) of the shutter time setting means.

FIG. 1 shows an image sensing device in a first embodiment of the invention. The illustration of FIG. 1 includes a photo-taking lens 1; a diaphragm 2; a shutter 3, and image sensing means 4 such as a CCD. The image sensing means 4 converts an optical image coming through the lens 1 and the diaphragm 2 into electrical information, such as electric charge information, and stores it. An X-Y address type MOS image sensor, a camera tube or the like may be employed in place of the CCD. The illustration further includes a processing circuit 5 which converts the output of the image sensing means CCD 4 or performs aperture compensation. A matrix circuit 6 produces a standard television signal such as an NTSC signal or the like by subjecting a signal processed through the processing circuit 5 to computing and multiplexing operations. A light measuring or photometric circuit 10 produces information on the brightness of an object to be photographed, for example, either by integrating the signal produced from the processing circuit 5 for every field period or by smoothing it through a smoothing circuit. A time setting member 11, for example, in the form of a dial 15 as shown in FIG. 4(a) also serves as an indicator. A conversion circuit 100 produces an image sensing time value as will be described later herein based on the output of the setting member 11. A switch circuit 12 is provided for permitting the operator to choose whether to have the exposure time of the shutter controlled based on the output of the light measuring or photometric circuit 10 or to have it controlled based on the setting of the time setting member 11. A display device 13 displays based on an output obtained via the switch circuit 12 in a manner described later herein. A shutter time control circuit 7 controls the length of exposure effected by the shutter 3 and controls the exposure time depending on the time control output obtained via the switch circuit 12. If the shutter 3 is a rotary shutter, for example, the shutter time control circuit 7 controls by varying the opening angle degree of the shutter 3. Furthermore, in the event of a focal plane shutter 3, the shutter is initially brought full open and is then totally closed after the lapse of a predetermined time period from the beginning of one field period. A driver circuit 8 serves as reading means and drives the image sensing means CCD 4 by supplying driving pulses of a predetermined voltage level determined by a timing signal corresponding to a standard television signal, which is produced from a clock pulse generator 9. Such being the arrangement, the image sensing means CCD 4 is driven by the driver circuit 8 at a standard television period. When using the NTSC system, for example, the image sensing means CCD 4 is driven in such a way as to obtain a field signal at every 1/60 sec. When using the PAL or SECAM system, the field signal is obtained at every 1/50 sec.

An aperture setting member 14 is, for example, an aperture setting ring. Information on an aperture setting value obtained by the aperture setting ring 14 is supplied to the light measuring circuit 10.

As mentioned in the foregoing, the light measuring circuit 10 computes photography time information from this aperture value information and information on the brightness of the object. For this purpose, the light measuring circuit 10 is provided, for example, with a digital computation circuit. This digital computation circuit gives photography time information, for example, by subtracting the logarithmic value of a diaphragm aperture from the logarithmic value of the brightness information. Furthermore, the light measuring circuit 10 produces a discrete value as a photography time value Td. The light measuring circuit 10 further produces this discrete value Td in a value which is the standard television period Ts multiplied by $2^{n/m}$. In the value $2^{n/m}$, n represents an integer and m an integer other than 0. It is an important feature of the invention that, in situations where the value Td is smaller than the standard television period Ts, a value can be selected from a plurality of time values Td which satisfy $Td = Ts \times 2^{-n/m}$, wherein Ts represents a standard television period, namely, for example, Ts = 1/60 (sec) in the NTSC system and Ts = 1/50 (sec) in the PAL or SECAM system, m and n represent natural numbers. With such a discrete value produced, the photography time Td and the driving operation on the image sensing means CCD 4 can be synchronized with each other to greatly facilitate computation and control. Furthermore, the arrangement of having powers of 2 also facilitates the control clock pulse generator 9 arrangement.

Figure 3:
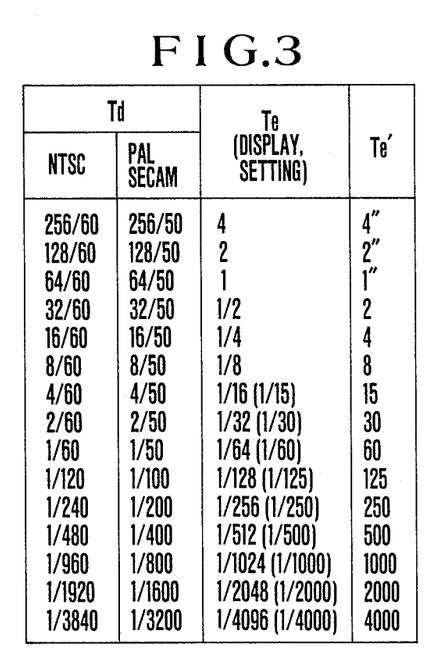
FIG. 3 is a chart showing, by way of example, a series of display values and a series of image sensing time values of the first embodiment.

FIG. 3 shows, by way of example, the arrangement of the discrete time values Td. If the image sensing means CCD 4 is to be driven based on the NTSC system, for example, one of a series of values 256/60, 128/60, , 1/1920 and 1/3840 is produced. If the PAL or SECAM system is used for driving the image sensing means CCD 4, one of a series of values 256/50, 128/50, , 1/1600 and 1/3200 is produced. In other words, in FIG. 3, the "m" in $2^{n/m}$ is m = 1.

When the switch circuit 12 is connected to one contact "a" of two contacts thereof, the output of the light measuring circuit 10 is supplied to the shutter time control circuit 7. The shutter 3 then effects an exposure for a period of time corresponding to the discrete output value Td produced from the light measuring circuit 10. The output of the light measuring circuit 10 is also supplied to the display device 13. The display device 13 displays a value very close to the photography time value Td among a series of display values Te, which are approximately $2^{q/p}$ (wherein q represents an integer and p an integer other than 0). In the example shown in FIG. 3, the value p is 1. Thus, in the event of shutter time 64/60, the shutter time value is displayed as 1.

If the shutter time is 1/240, a value close to it such as 1/256 or 1/250 is displayed. The display value 1/250, of course, may be replaced by another value such as 1/260.

If the switch circuit 12 is connected to the other contact "b", photography time is indicated by the setting dial 15 of the time setting member 11 as shown in FIG. 4(a). The time setting member 11 is provided with marks and graduations for a series of values as shown at Te' in FIG. 3 such as 4 sec, 2 sec, 1 sec, 2 (meaning ½ sec, the same applies to the rest), 4, 8, 15, as shown in FIG. 4(a). With the dial 15 adjusted to a mark 16, a conversion circuit 100 produces a photography time value Td corresponding to the adjusted graduation position of the dial 15. In this case, the graduations of the time setting member 11 serve as display means. Then, in correlation with the dial 15 setting values 4", 2", 1", , 2000 and 4000, which are arranged as shown at column Te' in FIG. 3, photography time values 256/60, 128/60, 64/60, , 1/1920 and 1/3840 are produced when using the NTSC system. In other words, the display graduations 16 of the dial 15 show output values Td smaller than one sec in reciprocal numbers Te' of the values Te by correlating them to the values Td. This arrangement permits simplification of the display. Thus, if the value Td is less than one sec, the value Te' is displayed or indicated in the form of the reciprocal of the value Te. In that event, to prevent the reciprocal display value from being mistaken for a display value Te' which is longer than one sec, the displays of the two different values have different colors. In that instance, the display is, for example, red when the value Td is shorter than one sec and blue when the value Td is one second or longer than one second. In another method for preventing these display values from being mixed up with each other, the display value for a value Td one second or longer than one sec may be indicated with a mark " affixed to the display value as in FIG. 4(a).

Therefore, the shutter time control circuit 7 causes the shutter 3 to perform exposure control in synchronization with the standard television system. Meanwhile, the display device 13 displays Te in response to an output produced via the switch 12 as shown in FIG. 3.

Figure 4B:
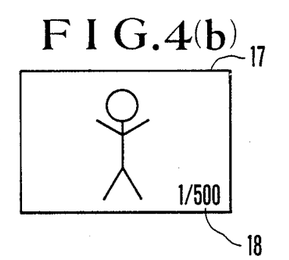
FIG. 4(b) shows, by way of example, a display of a display device.
Figure 4C:
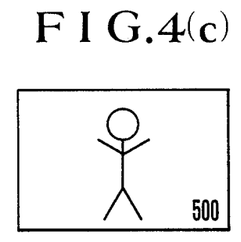
FIGS. 4(c) and 4(d) show other examples of displays of the display device.
Figure 4D:
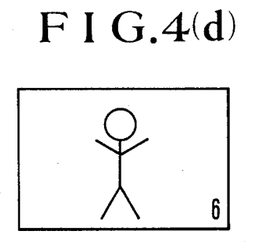

FIG. 4(b) shows a display of the display device 13. In this instance, the display value 18 appears within a view finder 17. Such a display, of course, may be on a cathode-ray tube or a liquid crystal display within an electronic view finder 17 or may be made by an LED provided on a part of the body of the image sensing device CCD 4. Furthermore, the display value of the display device 13 may be a value Te' instead of a value Te. FIGS. 4(c) and 4(d) show some examples of such variations. FIG. 4(c) shows an example in which a value Te = 1/500, i.e. Te' = 500, is displayed in red within the electronic view finder 17. In FIG. 4(d), a value Te = - Te' = 6 is displayed in blue within the electronic view finder 17.

With a display value thus selected from a series of display values which are obtained by approximately raising 2 to varied powers, the display is quite readily perceptible. With the series of shutter time values which have been conventionally used for the cameras with silver haloid film for the series of shutter time values of the image sensing device CCD 4, the operator is able to operate the device with the same feeling as when using a camera with silver haloid film. Meanwhile, the photography time is controlled depending on a series of values obtained by multiplying the standard television period by powers of 2. Therefore, the arrangement facilitates computation of exposure parameters since the exposure computation can be accomplished in the same manner as in the APEX (Additive System of Photographing Exposure) system, which is used for a camera with silver haloid film. In other words, in accordance with the arrangement of this embodiment, a combination of photographic parameters, such as an aperture value, etc., can be handled with the same feeling as when using a camera with silver haloid film. Furthermore, synchronization with the standard television signal is also stable.

Figure 2:
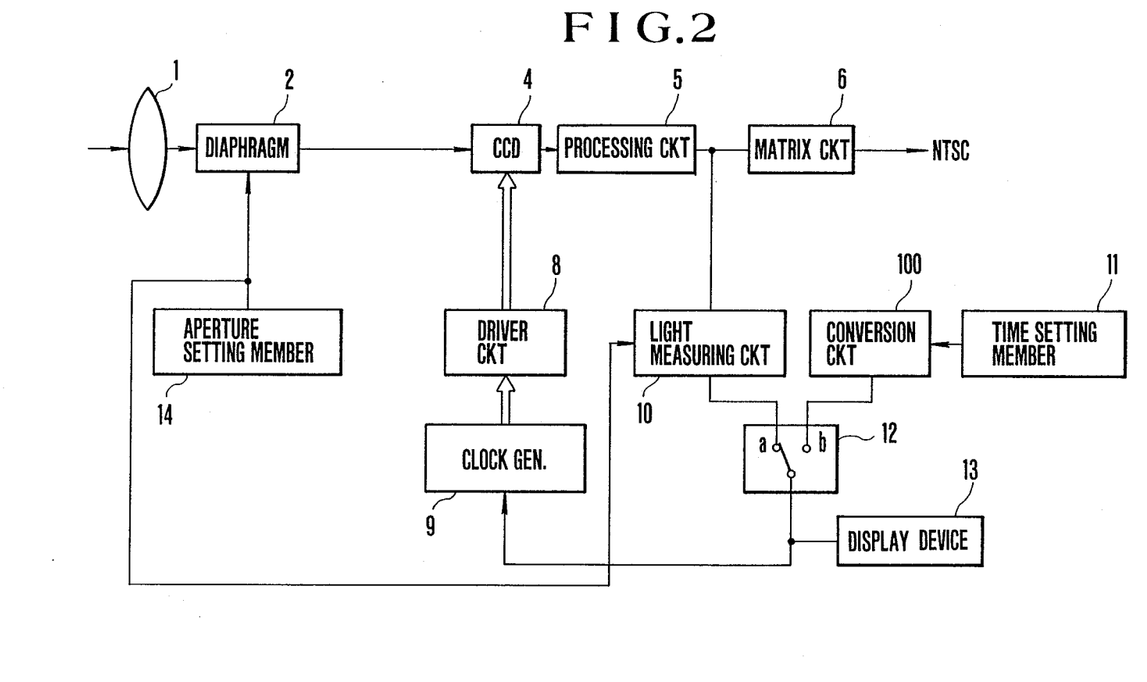
FIG. 2 is a block diagram showing another device in a second embodiment of the invention.

FIG. 2 shows the image sensing device CCD 4 arranged in a second embodiment of the invention. In this embodiment, the storage time, i.e. the image forming time Td, is controlled by controlling the storage of the image sensing means CCD 4 instead of controlling the exposure time by the shutter 3. In FIG. 2, the same components as those shown in FIG. 1 are indicated by the same reference numerals. In this case, however, the time control output which is produced via the switch 12 is supplied to the clock pulse generator 9. Furthermore, in this embodiment, the clock pulse generator 9 functions as a part of time control means for controlling the image forming time. The clock pulse generator 9 produces, in addition to the signals for driving imaging sensing means CCD 4 mentioned in the description of the embodiment shown in FIG. 1, another signal for controlling the electric charge storage time length at the image sensing means CCD 4 in response to the above time control signal.

Figure 5:
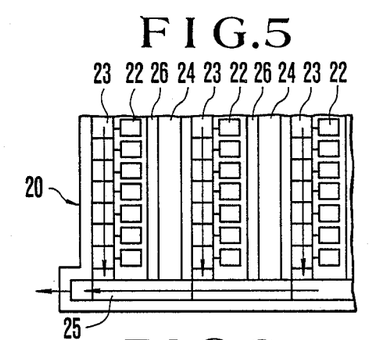
FIG. 5 shows, by way of example, image sensing means suited to the second embodiment.
Figure 6:
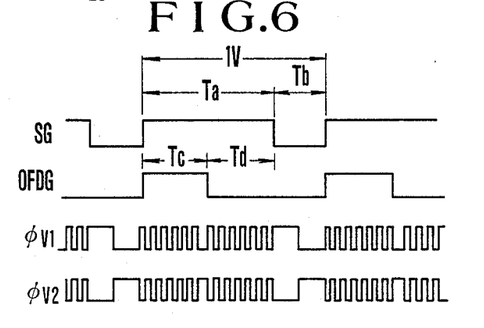
FIG. 6 is a chart showing, by way of example, the driving timing for the above image sensing means.

Referring to FIGS. 5 and 6, the embodiment is arranged as follows: FIG. 5 shows an example of the image sensing means CCD 4 which permits control over storage time. The image sensing means CCD 4 is basically in the form of an inter-line type CCD. The image sensing means CCD 4 includes a CCD chip 20; light-receiving or photo-sensitive cells 22; vertical shift registers 23; overflow drain gates 26; and a horizontal shift register 25. FIG. 6 is a chart showing the timing of driving pulses produced from the clock pulse generator 9 of FIG. 2. In FIG. 6 reference symbol SG identifies shift pulses which shift the electric charge stored at the photo-sensitive cells 22 to the vertical shift registers 23. During a period Tb in which the shift pulse signal SG remains at a low level, the electric charge is shifted from the photo-sensitive cell 22 to the register 23. Symbols $\phi v1$ and $\phi v2$ identify vertical transfer pulses which are in an antiphase relation to each other and which vertically transfer the electric charge shifted during the period Tb for one bit at every horizontal period during another period Ta. The periods Ta and Tb form one vertical period 1V.

Furthermore, although it is not shown, the horizontal register 25 receives a horizontal transfer pulse from the clock pulse generator 9 in such a manner that one horizontal line portion of the electric charge vertically transferred for one bit at every horizontal period is read out at a high speed within one horizontal scanning period. In using the CCD type of image sensing means, while such synchronous driving pulses are supplied, a high level pulse OFDG is supplied to the gate 26 only during the first period Tc within the period Ta. Therefore, during this period, the electric charge stored at the photo-sensitive cell 22 is discarded at the overflow drain 24. Accordingly, the virtual storing time (that is the image forming time) becomes a period Td.

With the high level period of the pulse OFDG controlled in this manner, the image sensing means CCD 20 storage time can be controlled from outside.

The arrangement of this embodiment is advantageous in controlling the storage time in situations where the image sensing means CCD 20 of the type described above is used. It goes without saying that, in FIG. 2, a shutter 3 may be used for the purpose of preventing a smear, etc.

Figure 7:
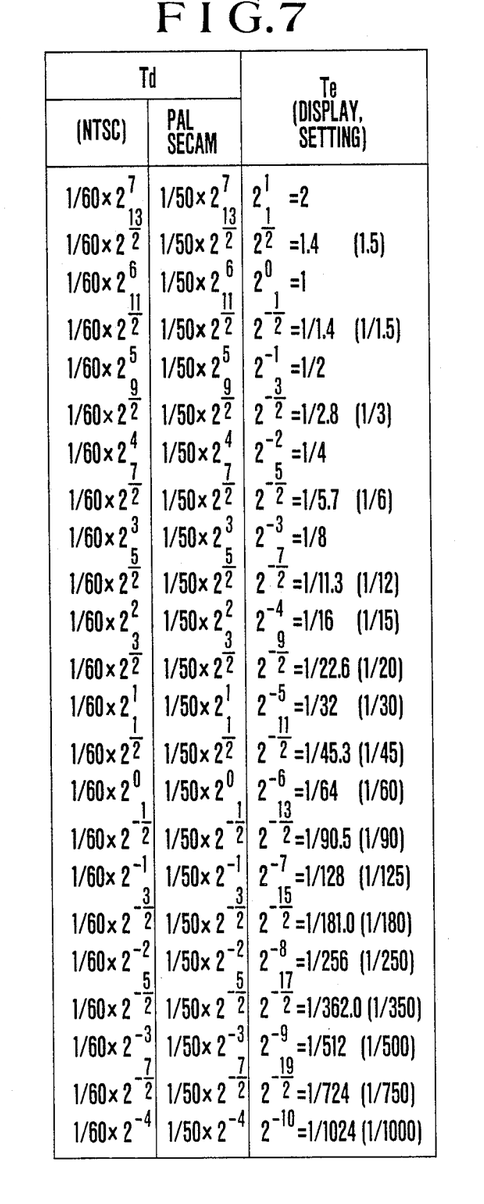
FIG. 7 is a chart showing a series of the display values and a series of image sensing time values of an image sensing device in a third embodiment of the invention.

FIG. 7 shows a third embodiment of the invention. In this case, the image sensing time Td which is determined by the exposure time or the storing time is controlled and in the following relation to the standard television period Ts:

$Td = Ts \cdot 2^{n/2}$ (wherein n represents an integer.)

In this instance, the time Te to be displayed becomes:

$Te \simeq 2^{q/2}$ (wherein q represents an integer.)

In this embodiment, there is obtained the relation $n = q + 6$. The time Te to be displayed may be an approximate value. In FIG. 7, such approximate values are shown, by way of example, within parentheses.

In this example, the exposure time or storing time Td is $Td = Ts \times 2^{n/2}$. However, in accordance with this invention, all the factors that facilitate the time control can be included by the formula $Td = Ts \times 2^{n/m}$ (wherein m represents an integer other than 0). Furthermore, with the time Te to be displayed expressed by $Te \simeq 2^{q/p}$, the display arrangement is applicable to all situations where the display is suitable for perception.

The example has a relation of $m = p$. However, when the image sensing time is automatically controlled on the basis of, for example, an aperture value and the brightness of the object, the setting relation may be replaced with $m > p$. In that instance, the display becomes somewhat coarse while the actual image sensing time is finely controlled. However, the coarse display has an advantage that the display can be prevented from becoming complicated.

Furthermore, in this embodiment, a relation of $n = q + 6$ is shown, by way of example. However, in the event of $m \neq p$, the relation, of course, does not have to be $n = q + 6$.

In accordance with the invention as described in the foregoing, the image forming time (exposure time or storing time) is selected from a series of values determined by multiplying a standard television period by $2^{n/m}$ (wherein n: an integer and m: an integer other 0). Therefore, the image sensing time control is in a synchronous relation to the standard television period. This arrangement facilitates not only the control operation but also the setting operations for various purposes. Furthermore, since the image sensing time is displayed in correlation with a series of values expressed by $2^{q/p}$ (wherein q: an integer and p: an integer other than 0), the display is very easily observable and readily perceptible.

What I claim:
1. An image sensing device comprising:
    (a) image sensing means for converting an optical image into an electrical signal;

(b) reading means for reading out the electrical signal of said image sensing means at a standard television period; and (c) time control means for discretely controlling image signal forming time at said image sensing means, said time control means being capable of selecting for said control a plurality of time values Td satisfying the following condition at least in cases where the value Td is smaller than Ts;

$Td = Ts \times 2^{-n}$, wherein Ts represents the vertical period of a standard television signal, and n represents natural numbers.

2. An image sensing device according to claim 1, wherein said time control means includes a shutter arranged to control the incident time of an image incident on said image sensing means.

3. An image sensing device according to claim 1, wherein said time control means is arranged to control said image signal forming time by controlling the electrical signal storing condition of said image sensing means.

4. An image sensing device according to claim 3, wherein said time control means includes a drain for selectively discarding the electrical signal at said image sensing means.

5. An image sensing device comprising:
(a) image sensing means for converting an optical image into an electrical signal;
(b) reading means for reading out the electrical signal of said image sensing means at a standard television period;
(c) shutter control means for discretely controlling the length of time of an exposure to be effected by said shutter, said shutter control means being capable of selecting for said control a plurality of time values Td which satisfy the following condition at least in cases where the value Td is smaller than Ts;

$Td = Ts \times 2^{-n}$, wherein Ts represents the vertical period of a standard television signal, and n represents natural numbers.

6. An image sensing device comprising:
(a) image sensing means for converting an optical image into an electrical signal;
(b) reading means for reading out the electrical signal of said image sensing means at a standard television period; and
(c) time control means for discretely controlling image signal forming time by controlling the electrical signal storing condition of said image sensing means, said time control means being capable of selecting for said control a plurality of time values Td which satisfy the following condition at least in cases where the value Td is smaller than Ts;

$Td = Ts \times 2^{-n}$, wherein Ts represents the vertical period of a standard television signal, and n represents natural numbers.

7. An image sensing device according to claim 6, wherein said time control means includes a drain for selectively discarding the electrical signal at said image sensing means.

8. An image sensing device comprising:
(a) image sensing means for converting an optical image into an electrical signal;
(b) reading means for reading out the electrical signal of said image sensing means at a standard television period; and
(c) time control means for discretely controlling image signal forming time at said image sensing means, said time control means being capable of selecting for said control a plurality of time values Td satisfying the following condition:

$Td = Ts \times 2^n$, wherein Ts represents the vertical period of a standard television signal, and n represents integers; and (d) display means for displaying said plurality of time values Td respectively, said display means having a plurality of display values Te corresponding to said time values Td, said display values Te satisfying:

$Te \approx 2^q$ wherein q represents integers.

9. An image sensing device according to claim 8, wherein said time control means includes a shutter arranged to control the incident time of an image incident on said image sensing means.

10. An image sensing device according to claim 8, wherein said time control means is arranged to control said image signal forming time by controlling the electrical signal storing condition of said image sensing means.

11. An image sensing device according to claim 10, wherein said time control means includes a drain for selectively discarding the electrical signal at said image sensing means.

12. An image sensing device according to claim 8, wherein each of said display values Te corresponds to the closest one of time values Td.

13. An image sensing device according to claim 8, wherein said display values Te correspond to 8, 4, 2, 1, ½, ¼, ⅛, 1/15, 1/30, 1/60, 1/125, 1/250, 1/500 and 1/1000.

14. An image sensing device according to claim 8, wherein said display means is arranged to display in reciprocals such values of said display values Te that correspond to time values shorter than one second.

15. An image sensing device according to claim 14, wherein said reciprocal display values which correspond to time values shorter than one second include 2, 4, 8, 15, 30, 60, 125, 250, 500 and 1000.

16. An imaging sensing device according to claim 8, wherein said display means includes a setting member for setting said time values.

17. An image sensing device according to claim 16, wherein said setting member includes a setting dial.

18. An image sensing device comprising:
(a) image sensing means for converting an optical image into an electrical signal;
(b) reading means for reading out the electrical signal of said image sensing means at a standard television period;
(c) time control means for discretely controlling picture signal forming time at said image sensing means, said time control means being capable of selecting for said control a plurality of time values Td satisfying the following condition:

$Td = Ts \times 2^n$, wherein Ts represents the vertical period of a standard television signal, and n represents integers; and (d) display means for displaying said plurality of time values Td respectively, said display means having a plurality of display values Te corresponding to said time values Td, said display values Te corresponding to a series of values 15, 8, 4, 2, 1, ½, ¼, ⅛, 1/15, 1/30, 1/60, 1/125, 1/250, 1/500, 1/1000, 1/2000 and 1/4000.

19. An image sensing device according to claim 18, wherein said time control means includes a shutter arranged to control the incident time of an image incident on said image sensing means.

20. An image sensing device according to claim 18, wherein an time control means is arranged to control said image signal forming time by controlling an electrical signal storing condition of said image sensing means.

21. An image sensing device according to claim 20, wherein said time control means includes a drain for selectively discarding the electrical signal at said image sensing means.

22. An image sensing device according to claim 18, wherein said display means includes a setting member for setting said time values.

23. An image sensing device according to claim 22, wherein said setting member includes a setting dial.

24. An image sensing device comprising:
(a) image sensing means for converting an optical image into an electrical signal;
(b) reading means for reading out the electrical signal of said image sensing means at a standard television period;
(c) time control means for discretely controlling picture signal forming time at said image sensing means, said time control means being capable of selecting for said control a plurality of time values Td satisfying the following condition:

$Td = Ts \times 2^n$, wherein Ts represents the vertical period of a standard television signal, and n represents integers; and (d) display means for displaying said plurality of time values Td respectively, said display means having a plurality of display values Te in the proximity of said time values Td, said display values Te being arranged to be selected from values satisfying:

$Te \simeq 2^q$, wherein q represents integers, and said display means being arranged to display in reciprocals such values among said display values Te that correspond to time values shorter than one second.

25. An image sensing device according to claim 24, wherein said time control means includes a shutter arranged to control the incident time of an image incident on said image sensing means.

26. An image sensing device according to claim 24, wherein an time control means is arranged to control said picture signal forming time by controlling an electrical signal storing condition of said image sensing means.

27. An image sensing device according to claim 26, wherein said time control means includes a drain for selectively discarding the electrical signal at said image sensing means.

28. An image sensing device according to claim 24, wherein said display values Te at least corresponding to 8, 4, 2, 1, $\frac{1}{2}$, $\frac{1}{4}$, $\frac{1}{8}$, 1/15, 1/30, 1/60, 1/125, 1/250, 1/500 and 1/1000.

29. An image sensing device according to claim 24, wherein said display means is arranged to differentiate the display of display values Te which correspond to time values Td longer than one second from that of display values Te which correspond to time values Td shorter than one second.

30. An image sensing device according to claim 29, wherein arrangement to make said differentiating display includes use of marks to be affixed to said display values Te.

31. An image sensing device according to claim 29, wherein arrangement to make said differentiating display includes use of a color to be applied to said display values Te.

32. An image sensing device according to claim 24, wherein said display means includes a setting member for setting said time values.

33. An image sensing device according to claim 32, wherein said setting member includes a setting dial.

34. A drive device for driving an image sensing device comprising:
(a) readout means for reading out an electrical signal generated by said image sensing device;
(b) time control means for discretely controlling said electrical signal forming time at said image sensing device, and time control means selecting one of a plurality of time values Td satisfying the following condition, at least in cases where the value Td is smaller than Ts:

$Td = Ts \times 2^n$, wherein Ts represents the vertical period of a standard television signal, and n represents integers.

35. A drive device according to claim 34, wherein said time control means includes a shutter arranged to control the incident time of an image on said image sensing device.

36. A drive device according to claim 34, wherein said time control means controls sensing condition of said image sensing device.

37. A drive device according to claim 34, wherein said Ts is equal to 1/50 (sec).

38. A drive device according to claim 34, wherein said Ts is equal to 1/60 (sec).

39. A device according to claim 1, 5, 6, 8, 16 or 24, wherein said Ts is equal to 1/50 (sec).

40. A device according to claim 1, 5, 6, 8, 18 or 24, wherein said Ts is equal to 1/60 (sec).

* * * * *